United States Patent
Hwang et al.

(10) Patent No.: US 10,050,818 B2
(45) Date of Patent: Aug. 14, 2018

(54) METHOD FOR TRANSMITTING DMRS FOR NARROW BAND TRANSMISSION, AND MTC DEVICE

(71) Applicant: LG ELECTRONICS INC., Seoul (KR)

(72) Inventors: Daesung Hwang, Seoul (KR); Kijun Kim, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/541,214

(22) PCT Filed: Jan. 12, 2016

(86) PCT No.: PCT/KR2016/000266
§ 371 (c)(1),
(2) Date: Jun. 30, 2017

(87) PCT Pub. No.: WO2016/114544
PCT Pub. Date: Jul. 21, 2016

(65) Prior Publication Data
US 2018/0006864 A1 Jan. 4, 2018

Related U.S. Application Data

(60) Provisional application No. 62/102,115, filed on Jan. 12, 2015.

(51) Int. Cl.
*H04W 72/00* (2009.01)
*H04L 27/26* (2006.01)

(52) U.S. Cl.
CPC ........ *H04L 27/2649* (2013.01); *H04L 27/261* (2013.01)

(58) Field of Classification Search
USPC ............................................ 455/21, 450–455
See application file for complete search history.

(56) References Cited

U.S. PATENT DOCUMENTS 9,794,014 B2 * 10/2017 Seo ..................... H04J 11/0056
2013/0135984 A1   5/2013 Choi et al.
(Continued)

FOREIGN PATENT DOCUMENTS

KR   10-2013-0049582 A   5/2013
WO   WO 2011/142625 A2   11/2011

OTHER PUBLICATIONS

ETRI, "Considerations on Uplink Reference Signal for MTC", 3GPP TSG RAN WG1 Meeting #79, San Francisco, USA, Nov. 17-21, 2014, R1-144916, 3 pages.
(Continued)

*Primary Examiner* — Fayyaz Alam
(74) *Attorney, Agent, or Firm* — Birch, Stewart, Kolasch & Birch, LLP

(57) ABSTRACT

One embodiment of the present specification provides a method by which a machine type communication (MTC) device configured to operate only in some bands among the system bands of a cell transmits a demodulation reference signal (DMRS) for the demodulation of uplink data. The method can comprise the steps of: selecting any one DMRS sequence among a plurality of sets of DMRS sequences having a length M according to a group hopping number and allocation area information of a sub-physical resource block (PRB), when an uplink signal is transmitted through the sub-PRB including the M number of subcarriers which is less than twelve subcarriers; and mapping the selected DMRS sequence on the M number of subcarriers of the sub-PRB, and transmitting the same.

12 Claims, 22 Drawing Sheets

(56) References Cited

U.S. PATENT DOCUMENTS

| | | | |
|---|---|---|---|
| 2014/0235256 A1* | 8/2014 | Takeda | H04W 52/0216 455/450 |
| 2015/0249517 A1* | 9/2015 | Seo | H04W 16/10 370/329 |
| 2017/0134129 A1* | 5/2017 | You | H04W 4/70 |
| 2017/0359820 A1* | 12/2017 | Gaal | H04L 5/0051 |

OTHER PUBLICATIONS

Sierra Wireless, "Coverage Enhancement PUSCH Simulation Results and Proposals", 3GPP TSG RAN WG1 Meeting #79, San Francisco, USA, Nov. 17-21, 2014, R1-145198 (revision of R1-144600), 7 pages.

* cited by examiner

DM-RS

DM-RS

METHOD FOR TRANSMITTING DMRS FOR NARROW BAND TRANSMISSION, AND MTC DEVICE

CROSS REFERENCE TO RELATED APPLICATIONS

This application is the National Phase of PCT International Application No. PCT/KR2016/000266, filed on Jan. 12, 2016, which claims priority under 35 U.S.C. 119(e) to U.S. Provisional Application No. 62/102,115, filed on Jan. 12, 2015, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

As one method for reducing manufacturing cost of the MTC device, the MTC device may use only a reduced band, that is, a subband regardless of a system bandwidth of a cell.

Furthermore, when the amount of traffic transmitted by the MTC device is small, the MTC device may preferably transmit uplink data, for example, by using only a frequency domain resource (for example, several subcarriers) having a size of one physical resource block (PRB) or less.

Meanwhile, in the previous method of transmitting uplink data, it is unable to efficiently configure a DeModulation Reference Signal (DMRS) for the frequency domain resource smaller than one PRB size. Accordingly, an efficient DMRS configuration method is required for the frequency domain smaller than one PRB size.

SUMMARY OF THE INVENTION

A disclosure of the present specification is to provide a method for transmitting a DMRS for a frequency domain resource smaller than a unit of PRB.

In addition, another disclosure of the present specification is to provide an MTC device for transmitting a DMRS for a frequency domain resource smaller than a unit of PRB.

In order to accomplish the object described above, a disclosure of the present specification provides a method for transmitting a demodulation Reference Signal (DMRS) for demodulating uplink data performed by a Machine Type communication (MTC) device configured to operate only in a part of bands of a system band of a cell. The method may include selecting a DMRS sequence according to a group hopping number and allocation region information of a sub-Physical Resource Block (PRB) among a plurality of sets of DMRS sequences having length M, when an uplink signal is transmitted through a sub-PRB including M number of subcarriers which is less than 12 subcarriers; and transmitting the selected DMRS sequence by mapping the selected DMRS sequence to the M number of subcarriers of the sub-PRB.

The method may further include generating a plurality of sets of DMRS sequences having length M.

Selecting the DMRS sequence may includes determining the group hopping number according to the allocation region information of the sub-PRB; and selecting one of the plurality of sets of DMRS sequences according to the determined group hopping number.

Selecting the DMRS sequence may includes determining to the allocation region information of the sub-PRB according to the group hopping number; and selecting one of the plurality of sets of DMRS sequences according to the determined allocation region information of the sub-PRB.

The method may further include receiving configuration information of a sub-PRB allocation region that is available to be used by the MTC device from a base station in advance.

The sub-PRB allocation region that is available to be used by the MTC device may not be used by other wireless device in a neighboring cell.

In order to accomplish the object described above, a disclosure of the present specification provides a Machine Type communication (MTC) device for transmitting a demodulation reference signal (DMRS) for demodulating uplink data and configured to operate only in a part of bands of a system band of a cell. The MTC device may include a RF unit; and a processor for controlling the RF unit. The processor may perform selecting a DMRS sequence according to a group hopping number and allocation region information of a sub-Physical Resource Block (PRB) among a plurality of sets of DMRS sequences having length M, when an uplink signal is transmitted through a sub-PRB including M number of subcarriers which is less than 12 subcarriers; and transmitting the selected DMRS sequence by mapping the selected DMRS sequence to the M number of subcarriers of the sub-PRB.

Advantageous Effects

According to a disclosure of the present specification, an efficient DMRS sequence may be configured and transmitted for a frequency domain resource smaller than a unit of PRB.

DESCRIPTION OF EXEMPLARY EMBODIMENTS

Figure 1:
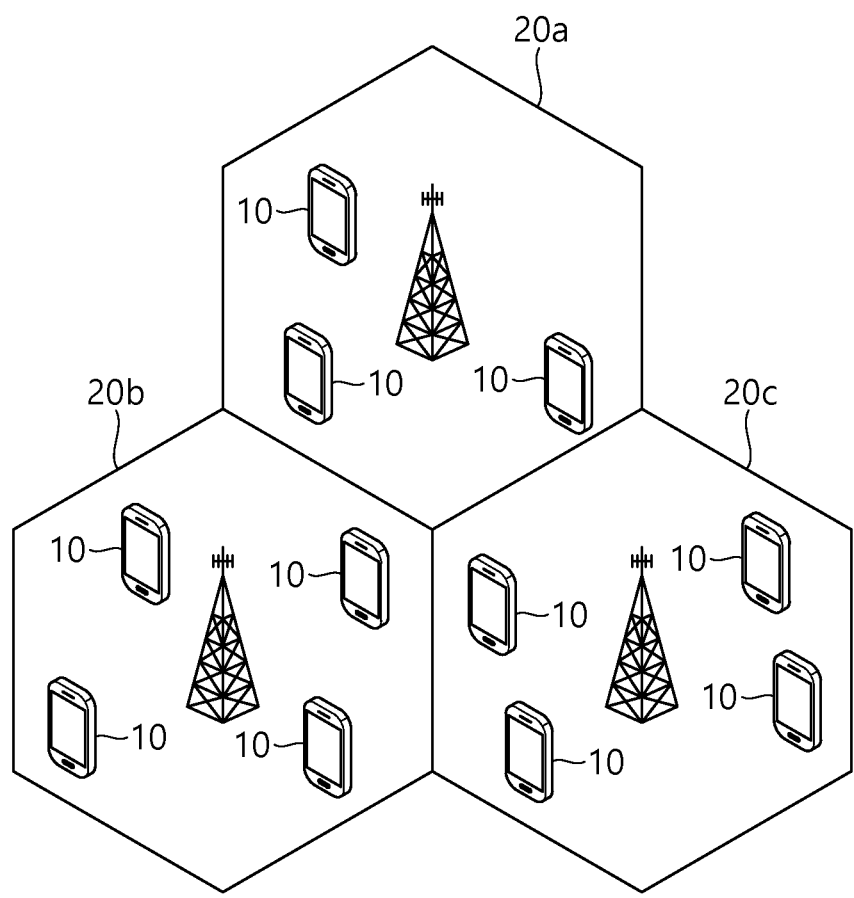
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
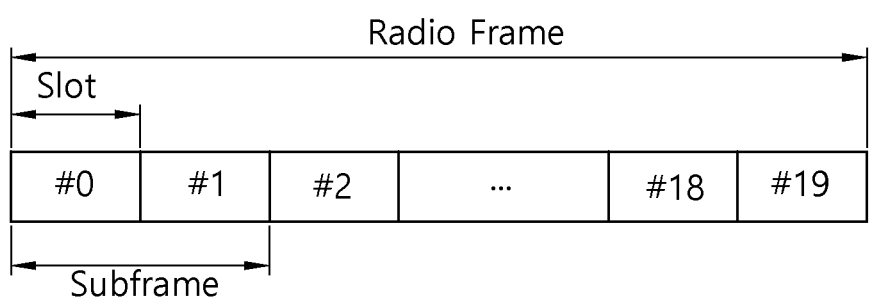
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
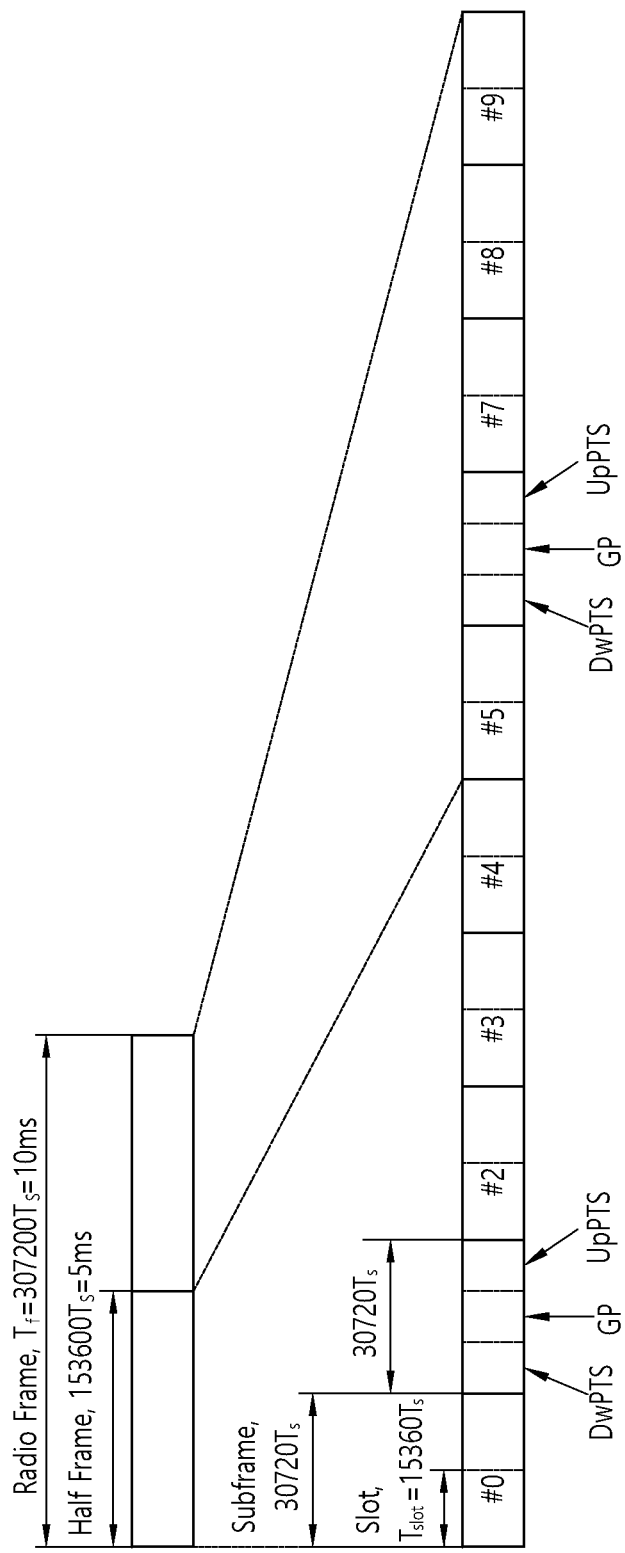
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | \multicolumn{10}{c}{Subframe index} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

TABLE 2

| | Normal CP in downlink ||| Extended CP in downlink |||
|---|---|---|---|---|---|---|
| | | UpPTS || | UpPTS ||
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
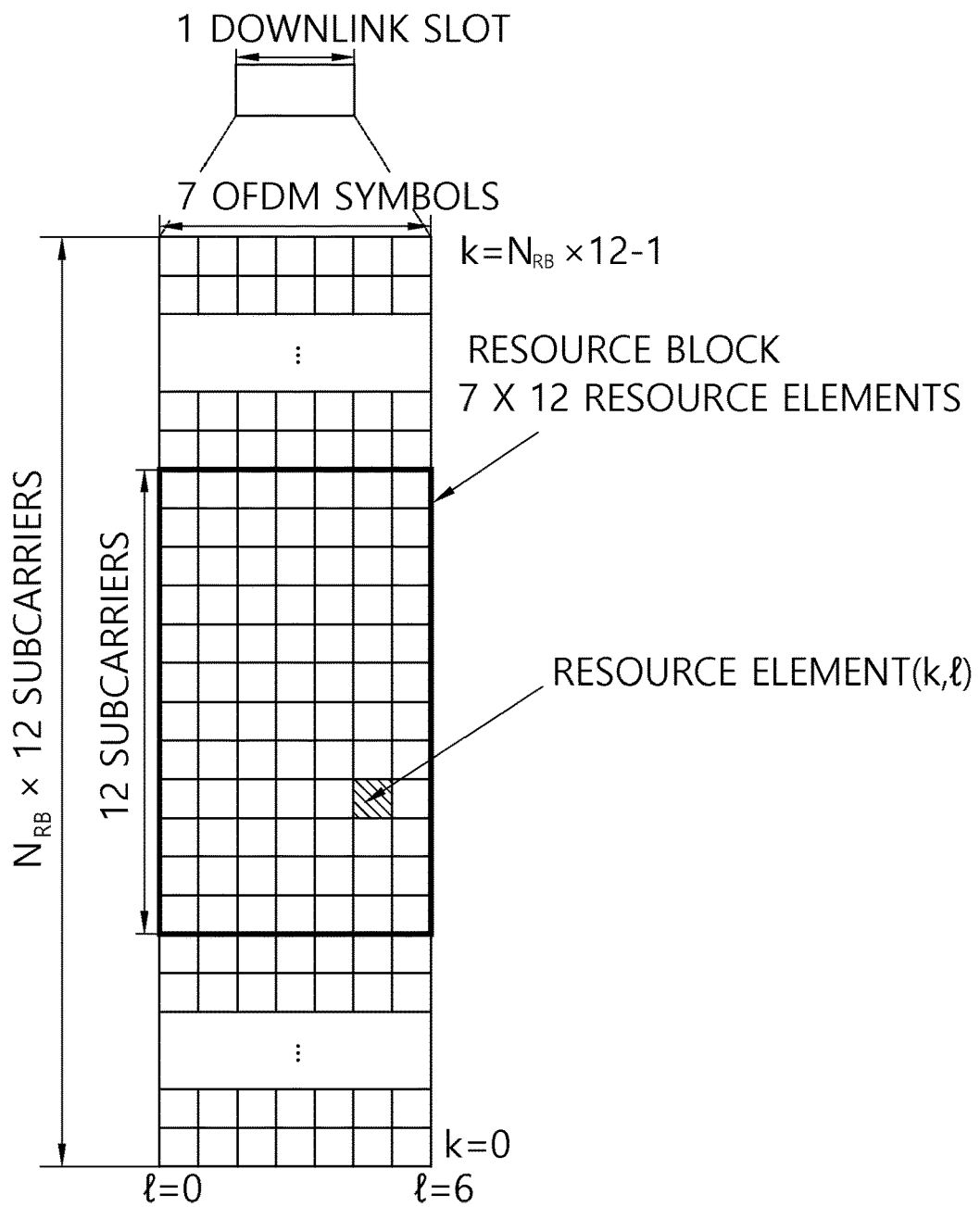
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 subcarriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
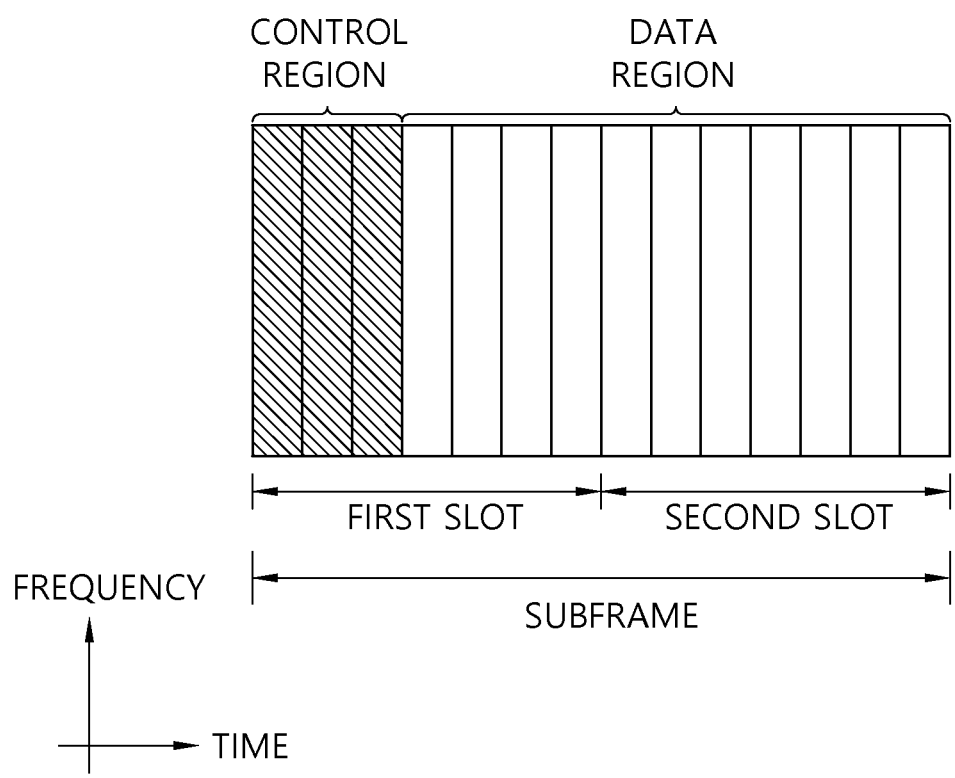
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
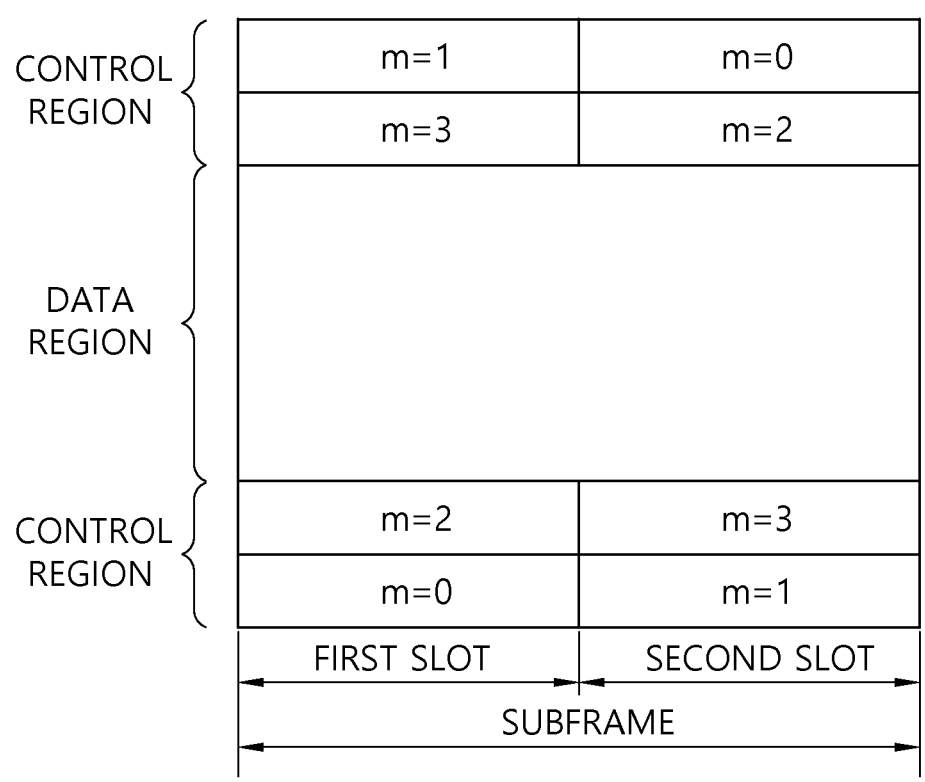
FIG. 6 illustrates a structure of an uplink subframe in 3GPP LTE.

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

The UL transport block may be transported on the PUSCH together with the UCI. This is referred to as multiplexing.

Figure 7:
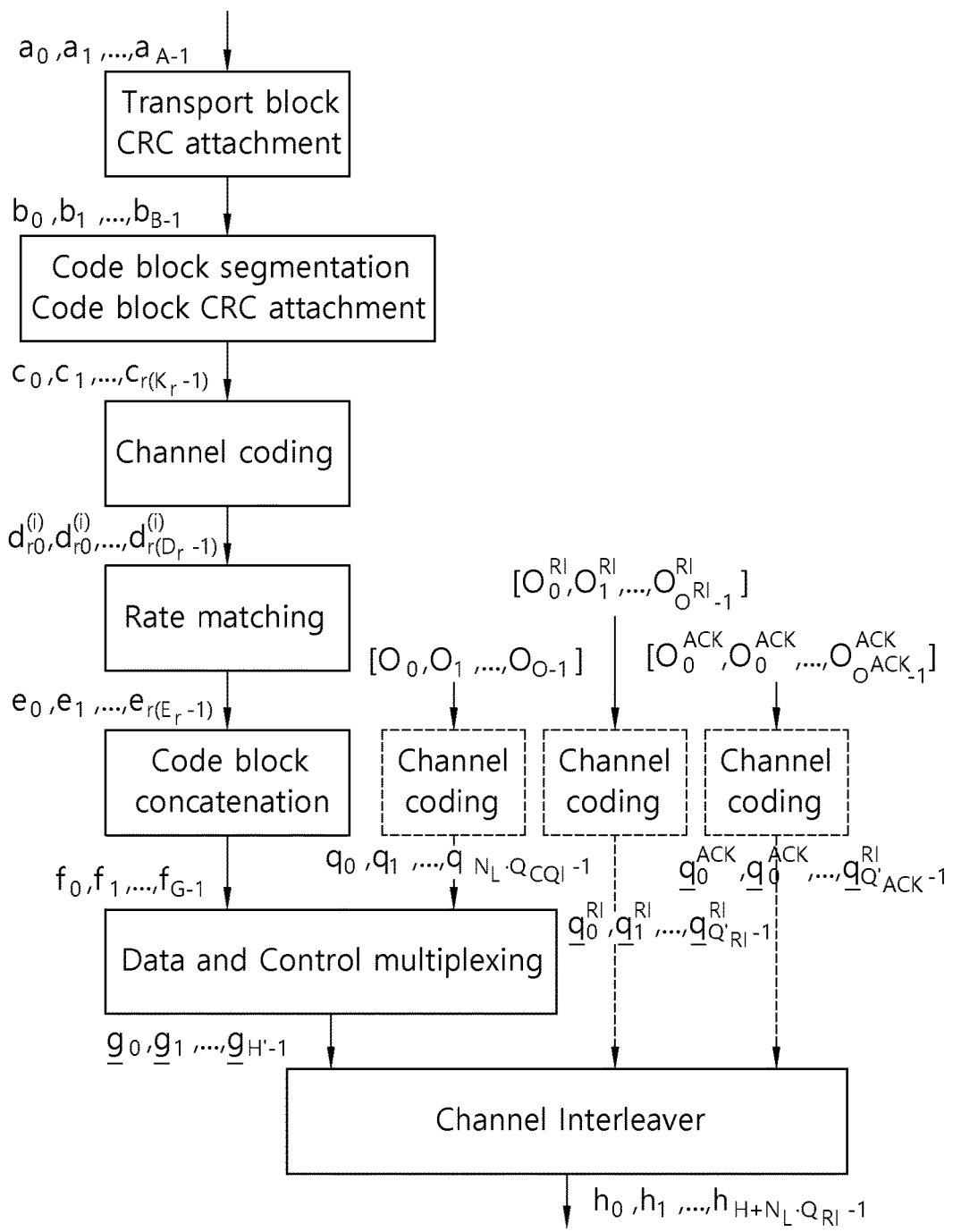
FIG. 7 is an exemplary diagram illustrating an example in which a transport block and a UCI for a UL-SCH are multiplexed in 3GPP LTE.

FIG. 7 is an exemplary diagram illustrating an example in which a transport block and a UCI for a UL-SCH are multiplexed in 3GPP LTE.

This may refer to Section 5 of 3GPP TS 36.212 V10.4.0 (2011-12) "Evolved Universal Terrestrial Radio Access (E-UTRA); Multiplexing and channel coding (Release 10)".

Data bits $a0, a1, \ldots, aA-1$ are given in the form of one transport block every TTI. First, cyclic redundancy check (CRC) parity bits $p0, p1, \ldots, pL-1$ are granted to the data bits $a0, a1, \ldots, aA-1$ to generate CRC additional bits $b0, b1, \ldots, bB-1$. Herein, $B=A+L$.

The CRC additional bits $b0, b1, \ldots, bB-1$ are split by the unit of a code block and the CRC parity bits are gain granted by the unit of the code block. A bit sequence output after code block segmentation is referred to as $cr0, cr1, \ldots, cr(Kr-1)$. Herein, when the total number of code blocks is C, r represents a code block number and Kr represents the number of bits for the code block number r.

Channel coding is performed with respect to a bit sequence for a given code block. Encoded bits are represented as $d(i)r0, d(i)r1, \ldots, d(i)r(D-1)$, D represents the number of bits encoded per output stream, and i represents an index of an encoder output bit stream.

Rate matching is performed with respect to the encoded bits and code block concatenation is performed to generate a data bit sequence $f0, f1, \ldots, fG-1$. Herein, G represents the total number of encoded bits used for transmission except for bits used for transporting control information when the control information is multiplexed on the PUSCH.

<Uplink Reference Signal>

Hereinafter, the uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero autocorrelation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of primary sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence ru,v(α)(n) may be defined based on a primary sequence bu,v(n) and a cyclic shift α by an equation given below.

$$r_{u,v}^{(\alpha)}(n)=e^{j\alpha n}b_{u,v}(n), 0\leq n<M_{sc}^{RS}$$ [Equation 1]

In Equation 1, MscRS=m*NscRB (1≤m≤NRBmax,UL) represents the length of the reference signal sequence. NscRB represents the size of a resource block represented by the number of subcarriers in the frequency domain and NRBmax,UL represents a maximum value of an uplink bandwidth represented by the multiple of NscRB. A plurality of reference signal sequences may be defined by differently applying α which is the cyclic shift value from one primary sequence.

The primary sequence bu,v(n) is divided into a plurality of groups and in this case, u ∈{0, 1, . . . , 29} represents a group number and v represents a primary sequence number in a group. The primary sequence depends on the length (MscRS) of the primary sequence. Each group includes one primary sequence (v=0) in which the length is MscRS with respect to m of 1≤m≤5 and includes two primary sequences (v=0, 1) in which the length is MscRS with respect to m of 6≤m≤nRBmax,UL. A sequence group number u and a primary sequence number v in the group may vary depending on a time like group hopping or sequence hopping.

When the length of the reference signal sequence is 3NscRB or more, the primary sequence may be defined by an equation given below.

$$b_{u,v}(n)=x_q(n \bmod N_{ZC}^{RS}), 0\leq n<M_{sc}^{RS}$$ [Equation 2]

In the above equation, q represents a root index of a Zadoff-Chu (ZC) sequence. NZCRS represent the length of the ZC sequence may be given as a prime number smaller than MscRS. The ZC sequence having the root index of q may be defined by Equation 4.

$$x_q(m) = e^{-j\frac{\pi qm(m+1)}{N_{ZC}^{RS}}}, 0 \leq m \leq N_{ZC}^{RS} - 1$$ [Equation 3]

In the above equation, q may be given by an equation given below.

$$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31$$ [Equation 4]

When the length of the reference signal sequence is 3NscRB or less, the primary sequence may be defined by an equation given below.

$$b_{u,v}(n)=e^{j\phi(n)\pi/4}, 0\leq n\leq M_{sc}^{RS}-1$$ [Equation 5]

A table given below shows an example in which φ(n) is defined when MscRS=NscRB.

TABLE 3

| | φ(0), . . . , φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | 1 | -1 | -3 |
| 22 | 1 | 1 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A table given below shows an example in which φ(n) is defined when MscRS=2*NscRB.

TABLE 4

| | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |

TABLE 4-continued

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of the reference signal may be applied as described below.

A sequence group number u of slot ns may be defined based on a group hopping pattern fgh(ns) and a sequence shift pattern fss by an equation given below.

$$u = (f_{gh}(n_s) + f_{ss}) \bmod 30 \quad \text{[Equation 6]}$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern fgh(ns) is the same with respect to the PUSCH and the PUCCH and may be defined by an equation given below.

The group hopping pattern fgh(ns) is the same with respect to the PUSCH and the PUCCH and may be defined by an equation given below.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 7]}$$

In the above equation, c(i) as an imitation pseudo-random sequence which is a PN sequence may be defined by a gold sequence having a length of –31. An equation given below shows one example of the gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \quad \text{[Equation 8]}$$

Herein, Nc=1600, x1(i) represents a 1 m-th sequence, and x2(i) represents a 2 m-th sequence. An imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern fss may be different with respect to the PUCCH and the PUSCH. The sequence shift pattern of the PUCCH may be given as fssPUCCH=NIDcell mod 30. The sequence shift pattern of the PUSCH may be given as fssPUSCH=(fssPUCCH+Δss) mod 30 and Δss∈{0, 1, . . . , 29} may be configured by the higher layer.

The sequence hopping may be applied only a reference signal sequence having a length longer than 6NscRB. With respect to a reference signal sequence having a length shorter than 6NscRB, the primary sequence number is given as v=0 in the primary sequence group. With respect to the reference signal sequence having the length longer than 6NscRB, the primary sequence number v in the primary sequence group in slot ns may be defined by Equation 10.

$$v = \begin{cases} c(n_s) & \text{if group hopping is disabled and sequence hopping is enabled} \\ 0 & \text{otherwise} \end{cases} \quad \text{[Equation 9]}$$

c(i) may be expressed by an example of Equation 9 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence rPUSCH(λ)(.) depending on a layer (0, 1, . . . , γ–1) may be defined by Equation 11.

$$r_{PUSCH}^{(\lambda)}(m \cdot M_{sc}^{RS} + n) = w^{(\lambda)}(m) r_{u,v}^{(\alpha_\lambda)}(n) \quad \text{[Equation 10]}$$

In the above equation, m=0, 1, . . . and n=0, . . . , MscRS–1. MscRS=MscPUSCH. An orthogonal sequence w(λ)(m) may be determined according to a table to be described below.

In the slot ns, the cyclic shift may be given as α=2πncs/12 and ncs may be defined by an equation given below.

$n_{cs,\lambda}=(n_{DMRS}^{(1)}+n_{DMRS,\lambda}^{(2)}+n_{PN}(n_s))\bmod 12$ [Equation 11]

In the above equation, n(1)DMRS may be determined according to a cyclicShift parameter provided by the higher layer. A table given below shows an example of n(1)DMRS determined according to the cyclicShift parameter.

TABLE 5

| Parameter | n(1)DMRS |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, n(2)DMRS,λ may be determined by a DMRS cyclic shift field in DCI format 0 for the transport block depending on corresponding PUSCH transmission. A table given below shows an example of n(2)DMRS,λ determined according to DMRS cyclic shift field.

TABLE 6

| DMRS cyclic shift field | n(2)DMRS), λ | | | | [w(λ)(0) w(λ)(1)] | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] | nPN(ns) may be defined by an equation given below.

$n_{PN}(n_s)=\sum_{i=0}^{7}c(8N_{symb}^{UL}\cdot n_s+i)\cdot 2^i$ [Equation 12]

c(i) may be expressed by the example of Equation 8 given above and applied for each cell of c(i). The imitation pseudo-number sequence generator may be initialized to $$c_{init}=\left\lfloor\frac{N_{ID}^{cell}}{30}\right\rfloor\cdot 2^5+f_{ss}^{PUSCH}$$

at the beginning of each radio frame.

The vector of the reference signal may be precoded by an equation given below.

$$\begin{bmatrix}\tilde{r}_{PUSCH}^{(0)}\\\vdots\\\tilde{r}_{PUSCH}^{(P-1)}\end{bmatrix}=W\begin{bmatrix}r_{PUSCH}^{(0)}\\\vdots\\r_{PUSCH}^{(U-1)}\end{bmatrix}$$ [Equation 13]

In the above equation, P represents the number of antenna ports used for the PUSCH transmission. W represents a precoding matrix. With respect to PUSCH transmission using a single antenna port, P=1, W=1, and γ=1. Further, with respect to spatial multiplexing, P=2 or 4.

With respect to each antenna port used for the PUSCH transmission, the DMRS sequence is multiplied by an amplitude scaling factor βPUSCH and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 8A:
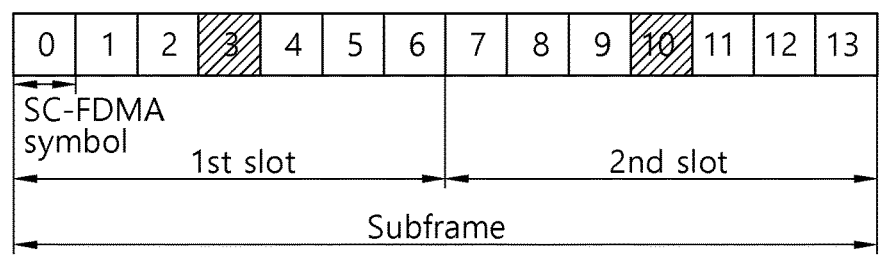
FIGS. 8a and 8b illustrate one example of a subframe in which a DMRS for a PUSCH is transmitted.
Figure 8A:
Figure 8B:
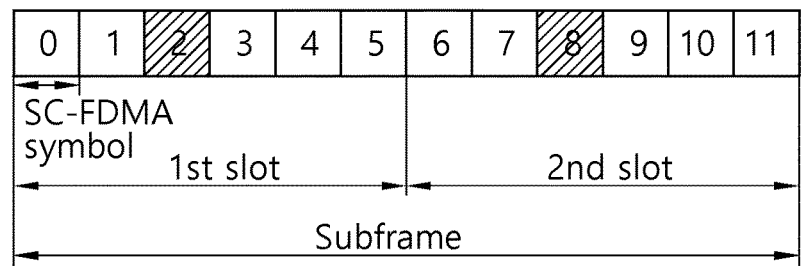
Figure 8B:

FIGS. 8 and 8b illustrate one example of a subframe in which a DMRS for a PUSCH is transmitted.

The structure of the subframe in FIG. 8a shows a case of the normal CP. The subframe includes a first slot and a second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 8b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Machine Type Communication (MTC)>

Meanwhile, hereinafter, the MTC will be described.

Figure 9A:
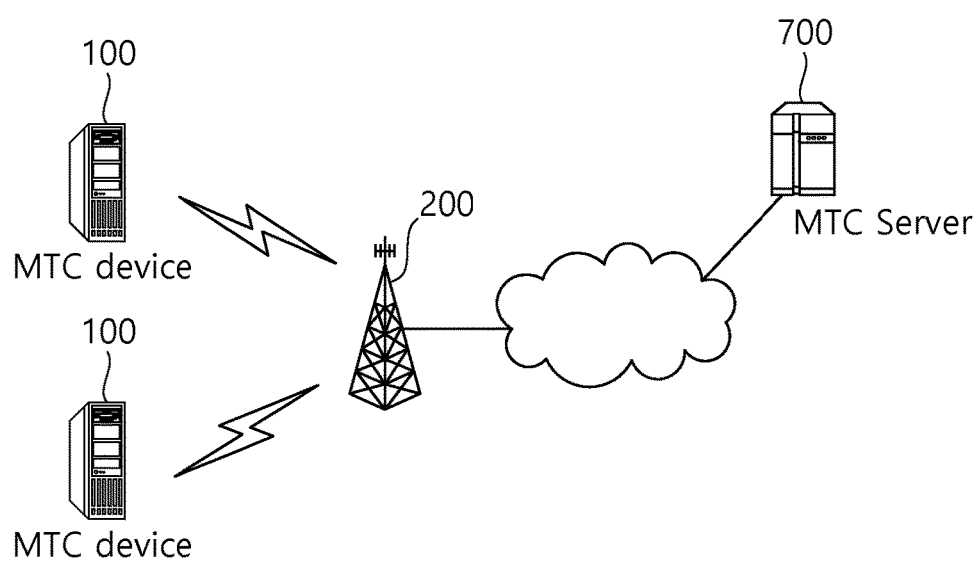
FIG. 9a illustrates an example of the machine type communication (MTC).

FIG. 9a Illustrates an Example of the Machine Type Communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 9B:
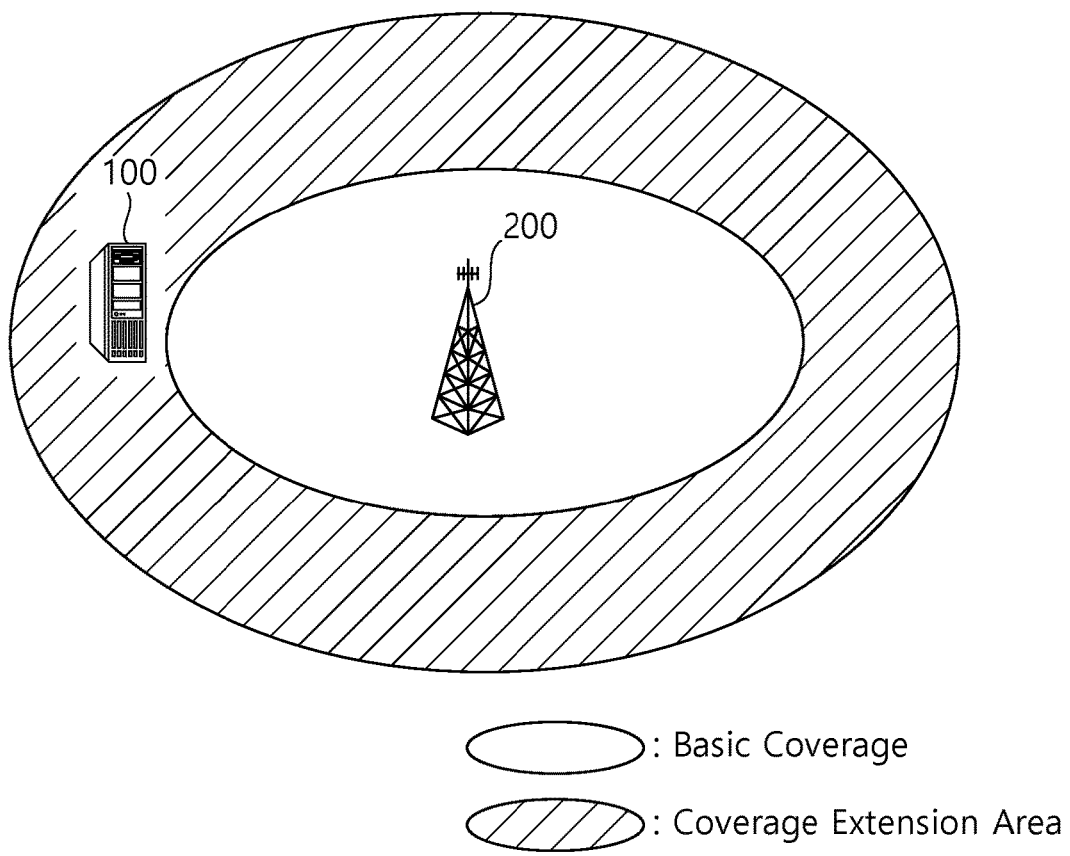
FIG. 9b illustrates an example of cell coverage extension for an MTC device.

FIG. 9b Illustrates an Example of Cell Coverage Extension for an MTC Device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 9C:
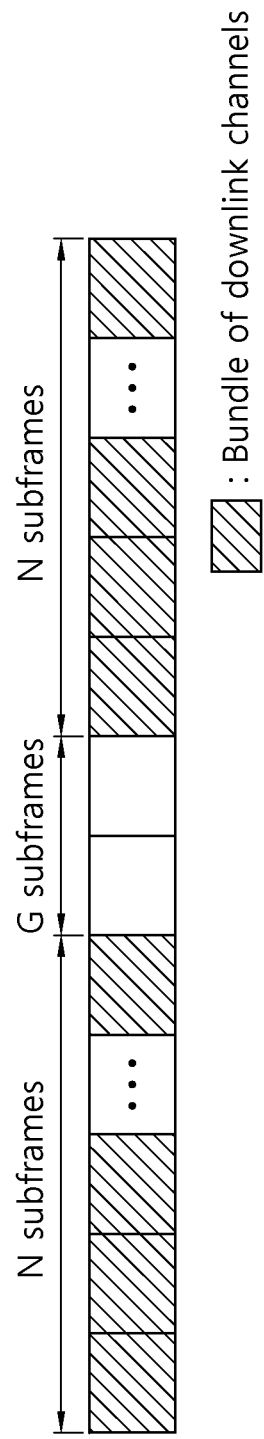
FIG. 9c is an exemplary diagram illustrating an example of transmitting a bundle of downlink channels.

FIG. 9c is an Exemplary Diagram Illustrating an Example of Transmitting a Bundle of Downlink Channels.

As known with reference to FIG. 9c, the base station repeatedly transmits he downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Meanwhile, the MTC device positioned in the coverage extension area may also transmit the bundle of the uplink channels (for example, the PUCCH and/or PUSCH) to the base station on the multiple subframes similarly.

Figure 10A:
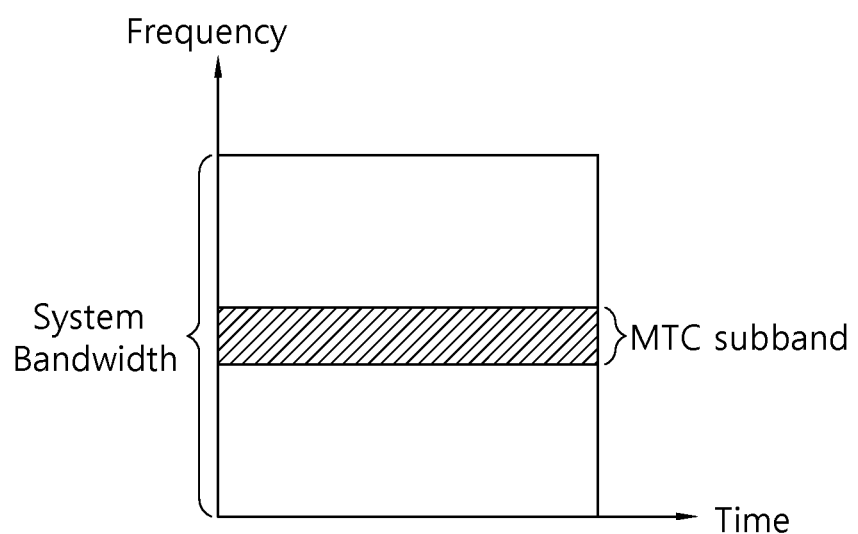
FIGS. 10a and 10b are exemplary diagrams illustrating an example of a subband in which the MTC device operates.
Figure 10B:
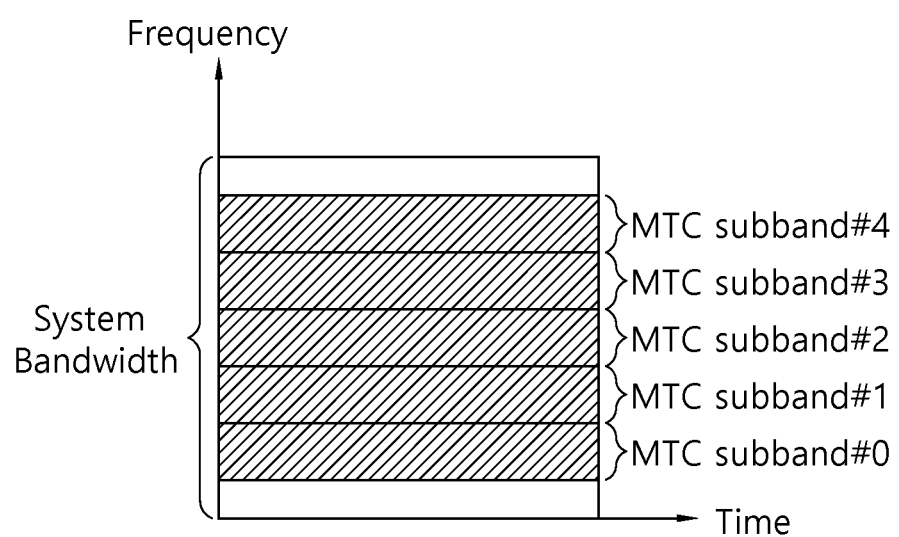

FIGS. 10a and 10b are Exemplary Diagrams Illustrating an Example of a Subband in which the MTC Device Operates.

As one method for low cost of the MTC device, the MTC device may use a subband at, for example, approximately 1.4 MHz regardless of a system bandwidth of the cell as illustrated in FIG. 10a.

In this case, an area of the subband in which the MTC device operates may be positioned at a central area (for example, 6 central PRBs) of the system bandwidth of the cell as illustrated in FIG. 10a.

Alternatively, as illustrated in FIG. 10b, multiple subbands of the MTC device are provided in one subframe for multiplexing of the MTC devices in the subframe, and as a result, the MTC devices may have different subbands. In this case, a majority of MTC devices may have other subbands other than the central area (for example, 6 central PRBs) of the system band of the cell.

On the other hand, when the amount of uplink traffic to be transmitted by the MTC device, it may be efficient for the base station to set only a band smaller than the subband illustrated in FIGS. 10a and 10b, for example, a band (frequency area) having a size equal to or smaller than one RB for the MTC device. This will be described with reference to FIGS. 11a and 11b.

Figure 11A:
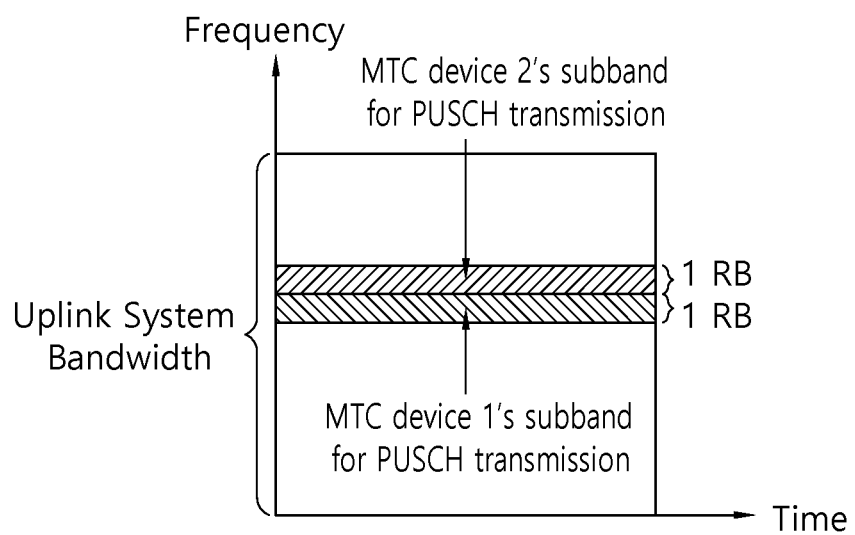
FIG. 11a illustrates an example of setting a subband of the MTC device to the size of one RB and FIG. 11b illustrates an example of setting the subband of the MTC device to the size of a ½ RB.
Figure 11B:
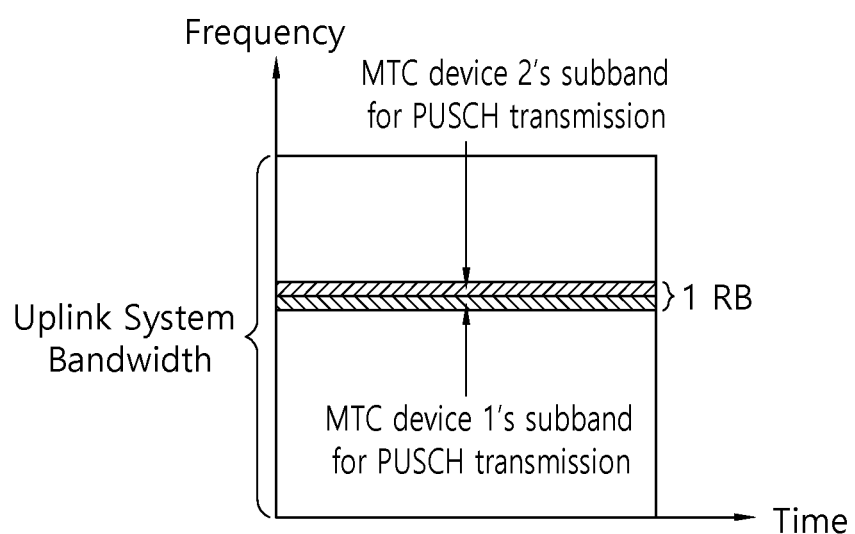

FIG. 11a Illustrates an Example of Setting a Subband of the MTC Device to the Size of One RB and FIG. 11b Illustrates an Example of Setting the Subband of the MTC Device to the Size of a ½ RB.

As known with reference to FIG. 11a, the subband having the size of one RB may be set for MTC device 1 and MTC device 2 for the PUSCH transmission. Further, as known with reference to FIG. 11b, one RB may be separately set for MTC device 1 and MTC device 2.

According to the peculiarity of the service provided through an MTC, it is highly possible for an MTC device to be placed in a situation that radio channel environment is not good or a level of pathloss is high. Accordingly, an MTC device is considered to transmit uplink data using a resource of the frequency domain smaller than one PRB (e.g., 0.5 PRB or 6 subcarriers). In this case, by limiting a transmission power for one PRB to a part of subcarriers, there is an effect of increasing a transmission power per RB.

<Disclosure of the Present Specification>

A disclosure of the present specification proposes a way to efficiently configure and transmit a sequence of DMRSs when transmitting uplink data using a resource of the frequency domain smaller than a unit of PRB. The DMRS sequence configuration method proposed in the present specification may be used for boosting power by allocating an RE only to a part of subcarriers in a PRB. As such, the RE allocation only to a part of subcarriers in a PRB is referred to as 'sub-PRB allocation'.

Hereinafter, the number of PRBs for transport block processing is referred to as 'reference PRB number' and the number of PRBs and the number of subframes on which the transport block is transmitted are referred to as 'transport PRB number' and 'transport subframe number', respectively. In this case, an MTC device may transmit the transport block generated through M number of PRBs, which is the 'reference PRB number' on N number of transport subframes, and may transmit using M/N number of PRBs in each subframe.

Here, it may be that M=1. In this case, the 'reference PRB number' is 1 (i.e., M=1), the 'transport PRB number' is 1/N PRB (i.e., 12/N subcarrier) and the 'transport subframe number' is N subcarriers. In addition, distinctively, it may be that M/N=1. That is, it may be that M=N, and in this case, the 'reference PRB number' is N, the 'transport PRB number' is 1 PRB and the 'transport subframe number' is N subcarriers.

However, hereinafter, the content of the present invention will be described based on the case that the 'reference PRB number' is 1 (i.e., M=1), the 'transport PRB number' is 1/N PRB (i.e., 12/N subcarrier) and the 'transport subframe number' is N subcarriers, for the convenience of description. However, the content of the present invention may be extendedly applied to the case that the 'reference PRB number' is M or M=N in the same way.

In addition, for the convenience of description, a case is mainly described that an MTC device or an MTC device required to extend coverage transmits a PUSCH, but it is understood that the content/concept of the present specification may also be applied to other UE. Furthermore, a method for transmitting uplink data using a resource smaller than 1 PRB size is described in the case that radio channel environment is not good or a level of pathloss is high performed by an MTC device. However, the description may also be applied to a transmission of a PUCCH. In addition, the description may also applied to a downlink transmission, for example, a transmission of a PDSCH or a (E)PDCCH.

<DMRS Sequence Configuration for Sub-PRB Allocation>

In the present specification, in order to transmit uplink data using a resource of the frequency domain of a size smaller than a unit of PRB, a DMRS sequence is configured by considering the following factors.

1) For a DMRS sequence, cubic metric or Peak-To-Average Power (PAPR) before and after performing Inverse Fast Fourier Transform (IFFT)

2) Cross-correlation between DMRS sequence candidates

3) Partial cross-correlation between DMRS sequences of which lengths are different Hereinafter, a configuration method of a DMRS sequence is described considering the cross-correlation between DMRS sequence candidates.

With respect to the cross-correlation between DMRS sequence candidates, the cross-correlation value between different sequences may be increased relatively as the number of types of a DMRS sequence or the number of candidates is increased. Accordingly, as the length of a DMRS sequence becomes short, the number of types of a DMRS sequence or the number of candidates may be restricted.

The number of types of the existing DMRS sequence is 30. And, the existing DMRS sequence may be selected based on a parameter including a Physical Cell ID (PCID), a Virtual Cell ID (VCID), a high layer signaled offset or a slot index.

More particularly, in order to limit the number of types of a DMRS sequence or the number of candidates, when the sub-PRB allocation is configured in a unit of M subcarriers, the number of DMRS sequences may be differently configured depending on M value. In addition, in the case that M value is less than a specific value (e.g., M=12), the number of DMRS sequences may be identically configured (e.g., the number of DMRS sequences=15). For example, in the case that the number of DMRS sequences is differently configured depending on M value, the number of DMRS sequences of each M may be 30*M/12. Accordingly when the sub-PRB allocation is configured in a unit of 6 subcarriers, the number of types of DMRS sequence may be 15.

However, as described above, in the case that the number of types of a DMRS sequence or the number of candidates is restricted, there is a limitation that cell planning becomes complex. For example, in the case that a DMRS sequence is selected based on a PCID, types of a DMRS is also restricted according to the corresponding PCID for other cells, and accordingly, the possibility of using the same DMRS sequence becomes increased.

In order to solve such a problem, it may be considered a scheme that a unit of bundle of sub-PRBs or subcarriers that is going to be used for each cell when allocating sub-PRBs is preconfigured. Particularly, on a network, a sub-PRB allocation region that is going to be used for each cell may be preconfigured and the configuration information may be shared through backhaul. In addition, a region that is going to be used may be preconfigured by a PCID as a parameter. In the case that the sub-PRB allocation is configured as a unit of 6 subcarriers, it may be preconfigured whether to use the first sub-PRB or the second sub-PRB in one PRB depending on a PCID value. Such a scheme may be extendedly applied to all PRBs that correspond to an MTC bandwidth. In this case, according to the selection of 15 types of DMRS sequence and 2 sub-PRBs, the sub-PRB allocation may be performed in total 30 schemes, and accordingly, the DMRS sequence between cells may be efficiently managed.

As another scheme, based on group hopping number u, a combination of a unit of bundle of sub-PRBs or subcarriers that is going to be used for each cell when allocating sub-PRBs with types of DMRS sequence may be selected. For example, when M=6, a DMRS sequence may be differently configured for each sub-PRB or may be configured within 15 types that are commonly designated in a sub-PRB. In addition, according to a sub-PRB allocation region, it may be decided whether to perform filling a padding location of a DMRS sequence from the most significant bit or from the least significant bit in a region of 12 length. The table below is an example that filling is performed according to the sub-PRB location. In this case, according to whether there is group hopping, the sub-PRB location may be changed for each subframe or each slot.

TABLE 7

| u | φ(0), . . . , φ(11) | | | | | | | | | | | |
|---|---|---|---|---|---|---|---|---|---|---|---|---|
| 0 | a00 | a01 | a02 | a03 | a04 | a05 | 0 | 0 | 0 | 0 | 0 | 0 |
| 1 | a10 | a11 | a12 | a13 | a14 | a15 | 0 | 0 | 0 | 0 | 0 | 0 |
| 2 | a20 | a21 | a22 | a23 | a24 | a25 | 0 | 0 | 0 | 0 | 0 | 0 |
| 3 | a30 | a31 | a32 | a33 | a34 | a35 | 0 | 0 | 0 | 0 | 0 | 0 |
| 4 | a40 | a41 | a42 | a43 | a44 | a45 | 0 | 0 | 0 | 0 | 0 | 0 |
| 5 | a50 | a51 | a52 | a53 | a54 | a55 | 0 | 0 | 0 | 0 | 0 | 0 |
| 6 | a60 | a61 | a62 | a63 | a64 | a65 | 0 | 0 | 0 | 0 | 0 | 0 |
| 7 | a70 | a71 | a72 | a73 | a74 | a75 | 0 | 0 | 0 | 0 | 0 | 0 |
| 8 | a80 | a81 | a82 | a83 | a84 | a85 | 0 | 0 | 0 | 0 | 0 | 0 |
| 9 | a90 | a91 | a92 | a93 | a94 | a95 | 0 | 0 | 0 | 0 | 0 | 0 |
| 10 | aA0 | aA1 | aA2 | aA3 | aA4 | aA5 | 0 | 0 | 0 | 0 | 0 | 0 |
| 11 | aB0 | aB1 | aB2 | aB3 | aB4 | aB5 | 0 | 0 | 0 | 0 | 0 | 0 |
| 12 | aC0 | aC1 | aC2 | aC3 | aC4 | aC5 | 0 | 0 | 0 | 0 | 0 | 0 |
| 13 | aD0 | aD1 | aD2 | aD3 | aD4 | aD5 | 0 | 0 | 0 | 0 | 0 | 0 |
| 14 | aE0 | aE1 | aE2 | aE3 | aE4 | aE5 | 0 | 0 | 0 | 0 | 0 | 0 |
| 15 | 0 | 0 | 0 | 0 | 0 | 0 | b00 | b01 | b02 | b03 | b04 | b05 |
| 16 | 0 | 0 | 0 | 0 | 0 | 0 | b10 | b11 | b12 | b13 | b14 | b15 |
| 17 | 0 | 0 | 0 | 0 | 0 | 0 | b20 | b21 | b22 | b23 | b24 | b25 |
| 18 | 0 | 0 | 0 | 0 | 0 | 0 | b30 | b31 | b32 | b33 | b34 | b35 |
| 19 | 0 | 0 | 0 | 0 | 0 | 0 | b40 | b41 | b42 | b43 | b44 | b45 |
| 20 | 0 | 0 | 0 | 0 | 0 | 0 | b50 | b51 | b52 | b53 | b54 | b55 |
| 21 | 0 | 0 | 0 | 0 | 0 | 0 | b60 | b61 | b62 | b63 | b64 | b65 |
| 22 | 0 | 0 | 0 | 0 | 0 | 0 | b70 | b71 | b72 | b73 | b74 | b75 |
| 23 | 0 | 0 | 0 | 0 | 0 | 0 | b80 | b81 | b82 | b83 | b84 | b85 |
| 24 | 0 | 0 | 0 | 0 | 0 | 0 | b90 | b91 | b92 | b93 | b94 | b95 |
| 25 | 0 | 0 | 0 | 0 | 0 | 0 | bA0 | bA1 | bA2 | bA3 | bA4 | bA5 |
| 26 | 0 | 0 | 0 | 0 | 0 | 0 | bB0 | bB1 | bB2 | bB3 | bB4 | bB5 |
| 27 | 0 | 0 | 0 | 0 | 0 | 0 | bC0 | bC1 | bC2 | bC3 | bC4 | bC5 |
| 28 | 0 | 0 | 0 | 0 | 0 | 0 | bD0 | bD1 | bD2 | bD3 | bD4 | bD5 |
| 29 | 0 | 0 | 0 | 0 | 0 | 0 | bE0 | bE1 | bE2 | bE3 | bE4 | bE5 |

Hereinafter, a configuration method of a DMRS sequence is described by considering a partial cross-correlation between DMRS sequences of which lengths are different.

For example, in the case that a DMRS sequence of which length is 24 is transmitted for transmitting a PUSCH in PRB indexes #0 and #1 in a first cell, and a DMRS sequence of which length is 12 is transmitted for transmitting a PUSCH in PRB index #1 in a second cell, interference may be exerted with each other in the region in which PRB index #1 and the DMRS sequence of the second cell are mapped in the DMRS sequence of the first cell. In this case, when two DMRS sequences have the same value for the overlapped region, an error may occur in estimating a radio channel based on DMRS in each cell or the accuracy may be decreased.

Similarly, an influence on the existing DMRS sequence is required to be considered even in the case of configuring a DMRS sequence for sub-PRB allocation.

Mapping of the existing DMRS sequence is started from the first subcarrier index in a PRB always. On the other hand, in the sub-PRB allocation, mapping of the DMRS sequence of length M may be started from a middle of a subcarrier index in a PRB. For example, when M=6, the DMRS sequence may be started from the first subcarrier index and the seventh subcarrier index of a PRB.

That is, according to the sub-PRB region selected in the sub-PRB allocation, the location of the existing DMRS sequence overlapped with the DMRS sequence of M length may be limited. For example, when subcarrier indexes are k0, k1, . . . , k11 in a PRB, in the case that the sub-PRB allocation is performed only for k0, k1, . . . , k5, the part of the existing DMRS sequence mapped to k6, k7, . . . , k11 is not required to be considered since there is no possibility that the part is overlapped with the corresponding DMRS of M length.

Figure 12:
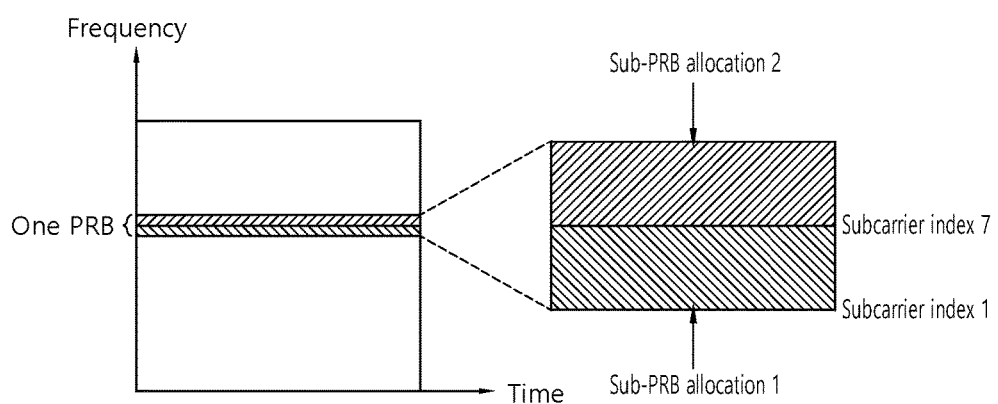
FIG. 12 illustrates an example of configuring a DMRS sequence independently based on a sub-PRB allocation region according to the present specification.

FIG. 12 Illustrates an Example of Configuring a DMRS Sequence Independently Based on a Sub-PRB Allocation Region According to the Present Specification.

Referring to FIG. 12, for the DMRS sequence for sub-PRB allocation, in order to avoid interference exerted from the existing DMRS sequence, a set of DMRS sequence types or a bundle of candidates may be configured independently from other sub-PRB regions according to the sub-PRB allocation region. That is, even in the case that group hopping number u is the same, the DMRS sequence may be differently configured according to the sub-PRB allocation region.

Figure 13A:
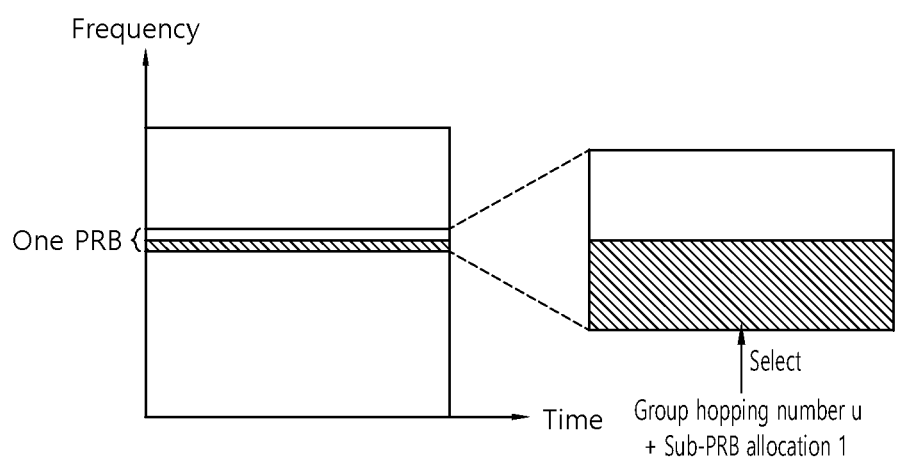
FIGS. 13a, 13b and 13c illustrate examples of a method for configuring a DMRS sequence independently according to the present specification.
Figure 13B:
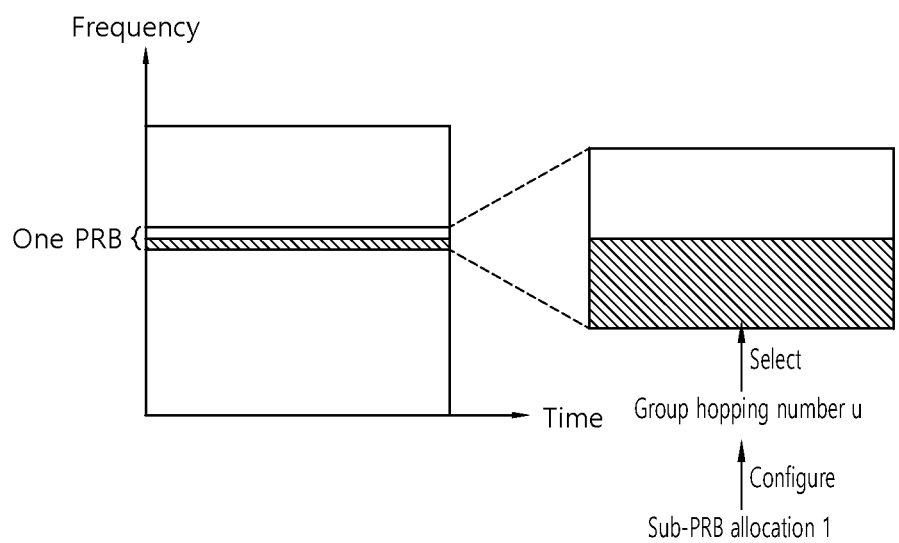
Figure 13C:
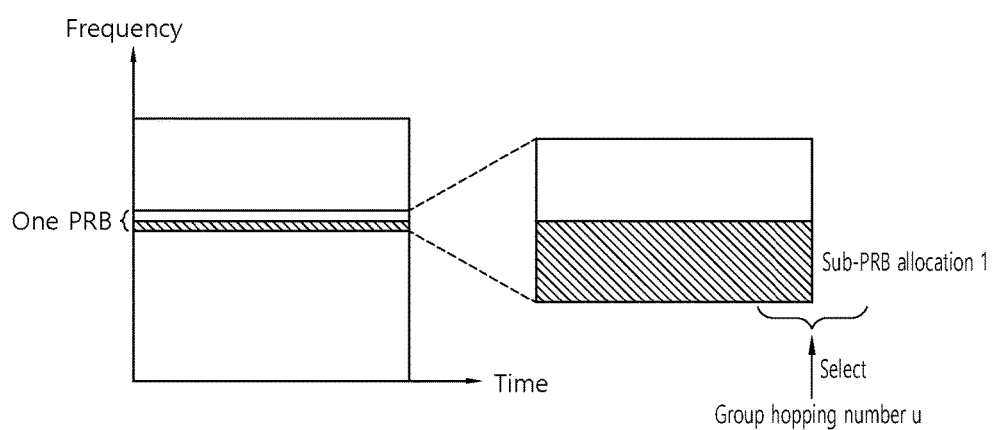

FIGS. 13a, 13b and 13c Illustrate Examples of a Method for Configuring a DMRS Sequence Independently According to the Present Specification.

Referring to FIG. 13a, when configuring a DMRS sequence to be used from candidates of the DMRS sequence, the information of a sub-PRB allocation region may be additionally used as a parameter in addition to group hopping number u.

Referring to 13b, when configuration group hopping number u, the information of a sub-PRB allocation region may be additionally used.

Referring to 13c, the information of a sub-PRB allocation region and a combination of DMRS sequence types may be selected from group hopping number u.

As such, the method of configuring a DMRS sequence independently according to the present specification has an advantageous effect in the aspect of complexity in design and degree of freedom of DMRS sequence selection.

As another method, when performing a sub-PRB allocation, it may be considered to configure a PRB or a PRB set in advance and to restrict the existing DMRS sequence not to be transmitted in the corresponding region. Here, a PRB or a PRB set may be preconfigured or shared through backhaul between neighboring cells on a network.

When configuring a DMRS sequence of length M, through the method described above, the restriction for the design complexity problem and the sequence selection may be solved, which should consider the influence on the existing DMRS sequence.

Hereinafter, particular embodiments for group hopping number u and the selection relation of a sub-PRB and a DMRS sequence will be described below.

1) According to group hopping number u, a DMRS sequence and a sub-PRB allocation region may be configured. The number of subcarriers constructing a sub-PRB allocation region may be identical, but may also be different. For example, M value may be one of 6, 4, 3 or 2, and may include an allocation scheme (M=12, 24, 36, . . . ) of a unit of PRB.

2) After a cell selects a sub-PRB allocation region through which a UE is going to transmit a PUSCH, a DMRS sequence may be selected based on group hopping number u and the selected sub-PRB allocation region. Here, group hopping number u may be configured based on the additionally selected sub-PRB allocation region. The number of group hopping number u may be less than 30. In addition, the number of group hopping number u may be a value decreased using modulo M.

3) After a cell selects a sub-PRB allocation region through which a UE is going to transmit a PUSCH, group hopping number u is generated using the selected sub-PRB allocation region as a parameter. And, a cell may select a DMRS sequence based on group hopping number u.

The sub-PRB allocation region described above may be included a PRB set that is going to perform a sub-PRB allocation for each cell.

Figure 14:
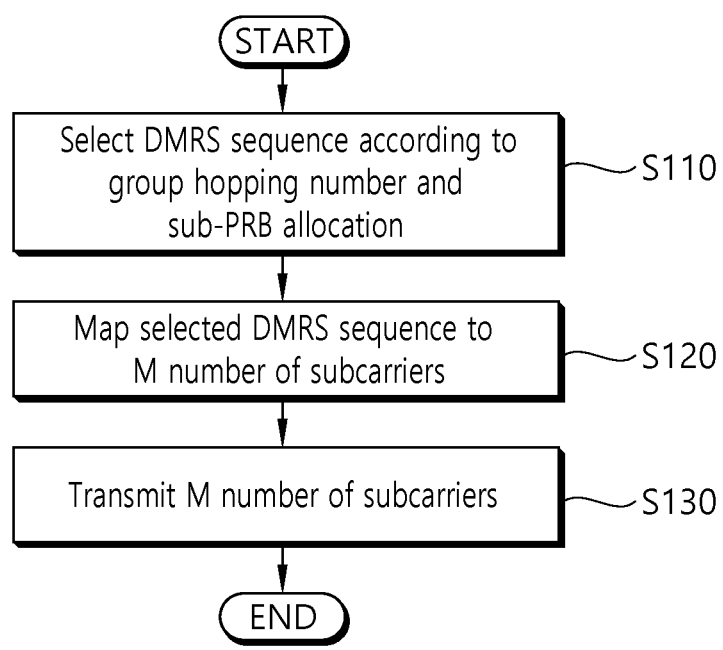
FIG. 14 is a flowchart illustrating a DMRS transmission method disclosed in the present specification.

FIG. 14 is a Flowchart Illustrating a DMRS Transmission Method Disclosed in the Present Specification.

Referring to FIG. 14, when transmitting uplink signal through a sub-PRB that includes M number of subcarriers less than 12 subcarriers, an MTC device selects a DMRS sequence according to a group hopping number and allocation region information of the sub-PRB among a plurality of sets of the DMRS sequences that has length M (step, S110). In addition, the MTC device may generate a plurality of sets of the DMRS sequences that has length M.

More particularly, the MTC device may determine the group hopping number according to the allocation region information of the sub-PRB, and select one of a plurality of sets of the DMRS sequences according to the determined group hopping number. In addition, the MTC device may determine the allocation region information of the sub-PRB according to the group hopping number, and select one of a plurality of sets of the DMRS sequences according to the determined allocation region information of the sub-PRB.

The MTC device may receive configuration information of a usable sub-PRB allocation region from a base station in advance. And, the sub-PRB allocation region may be a region which is not used by other wireless device in a neighboring cell.

The MTC device maps the selected DMRS sequence to the M number of subcarriers (step, S120). And, the MTC device transmits the M number of subcarriers of the sub-PRB to which the DMRS sequence is mapped to the base station (step, S130).

The embodiments of the present invention described so far may be implemented by various means. For example, the embodiments of the present invention may be implemented by hardware, software, or the combination thereof. This will be described in detail with reference to drawings.

<Cyclic Shift for Sub-PRB Allocation>

As described above with reference to Equation 11, the cyclic shift for the existing DMRS is configured in the form of 12 equal parts like $\alpha = 2\pi n_{cs}/12$. In addition, as described above with reference to Tables 5 and 6, parameter $n^{(1)}_{DMRS}$ for a cyclic shift includes 8 candidates, and the difference between cyclic shift configuration values different with each other is minimum 1.

However, when performing the sub-PRB allocation, a length of the DMRS sequence may be decreased less than 12. Accordingly, the cyclic shift based on the form of 12 equal parts is not proper for distinguishing the DMRS sequences of M length.

In order to solve such a problem, the cyclic shift may be maintained in the form of 12 equal parts, but an interval of the cyclic shift value between different cyclic shift parameters may be set as 2 or more. In addition, the cyclic shift may be redesigned as the form of 6 equal parts.

In the case that the cyclic shift may be maintained in the form of 12 equal parts, detailed embodiments for the cyclic shift candidates configured in DCI are as follows.

1) The cyclic shift parameter configured in DCI may be set to 0, 6, 4 and 10.

2) The cyclic shift parameter configured in DCI may be set to 0, 6, 2 and 10.

In this case, even in the case that an Orthogonal Cover Code (OCC) is applied, the cyclic shift parameter may be set to 0, 6, 4 and 10. In addition, the OCC scheme may be represented separated 1 bit and the cyclic shift field value in DCI may be decreased to 2 bits.

In the case that the cyclic shift is redesigned as the form of 6 equal parts, Equation 11 for configuring a cyclic shift may be modified as the following Equation.

$$n_{CS,\lambda} = (n_{DMRS}^{(1)} + n_{DMRS,\lambda}^{(2)} + n_{PN}(n_s)) \bmod 6 \qquad \text{[Equation 13]}$$

In addition, the cyclic shift parameter included in DCI may be modified into the following combination shape.

1) The cyclic shift parameter configured in DCI may be set to 0, 3, 2 and 5.

2) The cyclic shift parameter configured in DCI may be set to 0, 3, 1 and 5.

3) The cyclic shift parameter configured in DCI may be set to 0, 4, 2 and 5.

In this case, when the OCC is applied, the front two values of the orthogonal sequence may apply [1 1] and the rear two values may be set to [1 1]. In addition, the OCC scheme may be represented as a separate 1 bit, and the cyclic shift field value in DCI may be decreased to 2 bits.

In the case that the cyclic shift is redesigned as the form of 6 equal parts, the cyclic shift parameter configured in a higher layer may also be redesigned to have a value less than 6. Accordingly, it may be implemented that the cyclic shift parameter has the same candidates as the value that may be configured in DCI. For example, when the candidates are 0, 3, 2 and 5 in DCI, the cyclic shift parameter that may be configured in a higher layer may also have the candidates of 0, 2, 3 and 5.

The descriptions above are described based on the case that M=6, but it is understood that the descriptions above may also applied to the case that M has other value.

Figure 15:
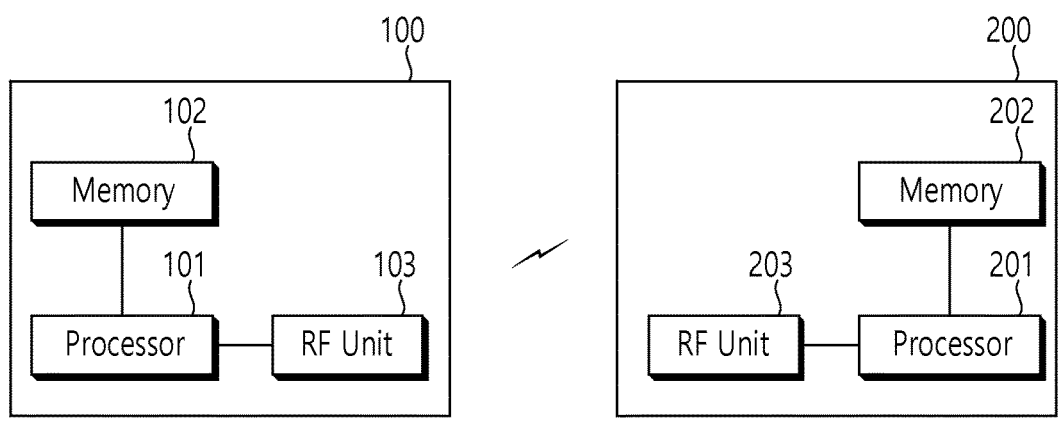
FIG. 15 is a block diagram illustrating a wireless communication system in which a disclosure of the present specification is implemented.

FIG. 15 is a Block Diagram Showing a Wireless Communication System Which Implements the Present Invention.

The base station 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The MTC device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for transmitting a demodulation reference signal (DMRS) for demodulating uplink data, the method performed by a Machine Type communication (MTC) device configured to operate only in a part of bands of a system band of a cell and the method comprising:
    selecting a DMRS sequence according to a group hopping number and allocation region information of a sub-Physical Resource Block (PRB) among a plurality of sets of DMRS sequences having length M, when an uplink signal is transmitted through a sub-PRB including M number of subcarriers which is less than 12 subcarriers; and
    transmitting the selected DMRS sequence by mapping the selected DMRS sequence to the M number of subcarriers of the sub-PRB.

2. The method for transmitting a DMRS of claim 1, further comprising generating a plurality of sets of DMRS sequences having length M.

3. The method for transmitting a DMRS of claim 1, wherein selecting the DMRS sequence includes:
    determining the group hopping number according to the allocation region information of the sub-PRB; and
    selecting one of the plurality of sets of DMRS sequences according to the determined group hopping number.

4. The method for transmitting a DMRS of claim 1, wherein selecting the DMRS sequence includes:
    determining to the allocation region information of the sub-PRB according to the group hopping number; and
    selecting one of the plurality of sets of DMRS sequences according to the determined allocation region information of the sub-PRB.

5. The method for transmitting a DMRS of claim 1, further comprising receiving configuration information of a sub-PRB allocation region that is available to be used by the MTC device from a base station in advance.

6. The method for transmitting a DMRS of claim 5, wherein the sub-PRB allocation region that is available to be used by the MTC device is not used by other wireless device in a neighboring cell.

7. A Machine Type communication (MTC) device for transmitting a demodulation reference signal (DMRS) for demodulating uplink data and configured to operate only in a part of bands of a system band of a cell, comprising:
    a RF unit; and
    a processor for controlling the RF unit,
    wherein the processor is configured to perform:
    selecting a DMRS sequence according to a group hopping number and allocation region information of a sub-Physical Resource Block (PRB) among a plurality of sets of DMRS sequences having length M, when an uplink signal is transmitted through a sub-PRB including M number of subcarriers which is less than 12 subcarriers; and
    transmitting the selected DMRS sequence by mapping the selected DMRS sequence to the M number of subcarriers of the sub-PRB.

8. The MTC device of claim 7, wherein the process further performs generating a plurality of sets of DMRS sequences having length M.

9. The MTC device of claim 7, wherein selecting the DMRS sequence includes:
    determining the group hopping number according to the allocation region information of the sub-PRB; and
    selecting one of the plurality of sets of DMRS sequences according to the determined group hopping number.

10. The MTC device of claim 7, wherein selecting the DMRS sequence includes:
    determining to the allocation region information of the sub-PRB according to the group hopping number; and
    selecting one of the plurality of sets of DMRS sequences according to the determined allocation region information of the sub-PRB.

11. The MTC device of claim 7, wherein the processor further performs receiving configuration information of a sub-PRB allocation region that is available to be used by the MTC device from a base station in advance.

12. The MTC device of claim 7, wherein the sub-PRB allocation region that is available to be used by the MTC device is not used by other wireless device in a neighboring cell.

* * * * *